United States Patent [19]

Lin et al.

[11] Patent Number: 5,028,259

[45] Date of Patent: Jul. 2, 1991

[54] RECOVERY OF PRECIOUS METAL

[75] Inventors: Lon-Tang W. Lin, Vallejo; Phillip L. Mattison; Michael J. Virnig, both of Santa Rosa, all of Calif.

[73] Assignee: Henkel Research Corporation, Santa Rosa, Calif.

[21] Appl. No.: 490,018

[22] Filed: Mar. 6, 1991

[51] Int. Cl.$^5$ .............................................. C22B 11/04
[52] U.S. Cl. .................................................. 75/722
[58] Field of Search .......................................... 75/722

[56] References Cited

U.S. PATENT DOCUMENTS 4,814,007  3/1989  Lin et al. ............................ 75/118 R

OTHER PUBLICATIONS

Minerals and Metallurgical Processing: 8/84, pp. 153–157 "Selectivity... Solutions" J. Chem. Soc.: 1951, pp. 2492–2494 The Basic Strength of Methylated Guanidines.

*Primary Examiner*—Peter D. Rosenberg
*Attorney, Agent, or Firm*—Ernest G. Szoke; Wayne C. Jaeschke; Patrick J. Span

[57] ABSTRACT

An improved process for recovery for precious metals such as gold and silver from aqueous cyanide solutions by contact with certain guanidine reagents. The guanidine reagents not only extract the precious metal but may provide advantages in selectivity of gold over other metals, such as tetra- and pentahydrocarbon substituted non-resin guanidine reagents and tri- and tetrahydrocarbon substituted resin guanidine reagents.

30 Claims, No Drawings

RECOVERY OF PRECIOUS METAL

BACKGROUND OF THE INVENTION
1. Field of the Invention

This invention relates to an improvement in the recovery of precious metals such as gold and silver and in particular to the recovery of gold from aqueous cyanide solutions thereof. The recovery is achieved by contact of the aqueous cyanide solution containing the precious metals, particularly gold, with a reagent containing a guanidine functionality. The guanidine reagent extracts the gold from the aqueous solution and the gold is then subsequently stripped from the guanidine reagent and recovered by conventional methods. The invention also relates to certain novel guanidine compounds which are suitable for extracting gold from cyanide solutions.

2. Description of Related Art

Gold occurs primarily as the native metal, alloyed with silver or other metals or as tellurides. It is commonly associated with the sulfides of iron, silver, arsenic, antimony and copper. Silver occurs as finely disseminated metal in rocks of hydrothermal origin as silver chloride, sulfide or tellurides and as complex sulfides with antimony and arsenic. Historical practice with ores containing native metal involves crushing, concentration of the gold or silver by gravity separation and recovery by amalgamation with mercury. Environmental concerns have resulted in abandonment of this process in most cases. Currently there are two major processes for recovery of gold and/or silver. The most widely accepted processes today involve leaching with caustic cyanide solution coupled with recovery of the metal values by concentration with zinc dust (Merrill-Crowe) or concentration of the gold and silver cyanide complexes by absorption on charcoal (carbon absorption scheme) also referred to as Carbon in Column (CIC) or Carbon in Pulp (CIP). Another process recently practiced in the Soviet Union is one in which quaternary amine ion exchange resins are employed as a replacement for charcoal in the carbon absorption scheme.

In a recent publication "Selectivity Considerations in the Amine Extraction of Gold from Alkaline Cyanide Solutions" by M. A. Mooiman and J. D. Miller in "Minerals and Metallurgical Processing", August 1984, Pages 153–157, there is described the use of primary, secondary and tertiary amines to which have been added certain Lewis base modifiers such as phosphorus oxides and phosphate esters for the extraction of gold from alkaline cyanide solutions.

Clarified leach liquors containing the gold are obtained by leaching with cyanide solutions through either the dump or heap leaching techniques. In heap leaching, the ore is placed on specially prepared impervious pads and a leaching solution is then applied to the top of the heap and allowed to percolate down through the heap. The solution containing the dissolved metal values eventually collects along the impervious pad and flows along it to a collection basin. From the collection basin, the solution is pumped to the recovery plant. Dump leaching is similar to heap leaching, in which old mine waste dumps which have sufficient metal value to justify processing are leached in place. The gold in clarified leach solutions may be recovered by direct precipitation in the Merrill-Crowe process, or by adsorption on Charcoal in Columns (CIC), followed by either electrowinning or by precipitation in the Merrill-Crowe process.

In certain conditions, unclarified solutions are generated by agitated vat leaching. In this continuous Carbon in Pulp (CIP) leaching process, the ore is slurried with agitated leach solution in the presence of carbon granules to generate a pulp. Dissolved gold is adsorbed onto the carbon resulting in low aqueous gold concentrations, which often increases the rate and completeness of gold extraction from the ore. Carbon granules carrying the gold are separated from the pulp by screening, and the gold is recovered from the carbon typically by elution with sodium hydroxide solution followed by electrowinning. Before the carbon granules can be returned to the leaching step, they must be activated by hazardous and expensive washing and heating steps. Coconut shell activated carbon is preferred, but is in short supply and expensive.

Different amine functionalities have been considered in the past in both the liquid/liquid extraction an liquid/solid extraction of gold. For liquid/solid extraction auricyanide is to strongly bound with the quaternary amines of the resins, so that stripping is difficult and requires special treatment. In addition, no selectivity of metal cyanide complexes and leach liquors is shown. Resins with weaker basic amine functionalities cannot perform well in the pH range (10–11), the pH of the common leach liquors. For liquid/liquid extraction such as the work of Mooiman and Miller, organophosphorus modifiers, i.e. trialkylphosphates are required to increase the amine basicity in order to permit efficient extraction of the gold materials. These materials must be used in large amounts. The systems still do not extract adequately at the typical pH of leach liquors.

In commonly assigned U.S. Pat. No. 4,814,007, there is described the use of guanidine compounds for extracting precious metals particularly gold from aqueous alkaline cyanide solutions. Specific guanidine compounds disclosed therein are certain di-alkyl guanidines such as di-n-octyl, di-2-ethylhexyl and di-tridecyl, guanidines employed in a liquid/liquid solvent system. In a solid/liquid system, an ion exchange resin carrying guanidyl functionality was employed, specifically a butyl, hexyl guanidine carried on a chloromethylated polystyrene resin having a divinylbenzene content, for example, of 2%. In general the guanidine compounds had the formula

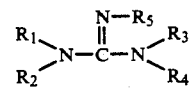

when $R_1$ through $R_5$ are H, an ion exchange resin carrier or a hydrocarbon group having up to 25 carbon atoms. In solutions containing gold, silver and copper, selectivity experiments showed a general preference of gold over silver or copper.

In South African Patent 71/4981 the use of guanidines for extraction of gold from aqueous acidic solutions is described. While general reference is made to alkyl substituted guanidines in which the alkyl group contains 1–6 carbon atoms, the specific resin employed used an unsubstituted guanidine.

In South African Patent 89/2733, a similar process is described using resins containing guanidyl functionality for recovering gold from aqueous alkaline cyanide solutions.

DESCRIPTION OF THE INVENTION

It has now been discovered that certain guanidine compounds provide for an improved process for the extraction and recovery of precious metals, such as gold and silver. It was found that ion exchange resin carrying guanidyl functionality from a methyl substituted guanidine will extract precious metals, particularly when tri- or tetra-methyl substituted. Further the tri- or tetra-hydrocarbon substituted resin products, either substituted with methyl or hydrocarbon groups containing up to 25 carbon atoms provide for increased selectivity in the extraction of precious metals, particularly gold, from aqueous, alkaline cyanide solutions. This selectivity advantage is not only found with the highly substituted guanidyl resin reagents employed in solid/liquid extraction systems, but is also achieved in liquid/liquid systems wherein a guanidine compound, tetra- or penta-hydrocarbon substituted, is employed as an extractant dissolved in a water-immiscible organic solvent. Thus, these specific reagents described herein provide for an improved process for the recovery of precious metals from aqueous, alkaline, cyanide solutions. The improved process may be generally defined as a process for recovery of a precious metal from an aqueous, alkaline, cyanide solution containing the precious metal wherein (A) the aqueous solution containing the precious metal is contacted with the guanidine functional extraction reagent whereby the precious metal is extracted or removed from the aqueous solution and (B) the guanidine functional extraction reagent now containing the precious metal is separated from the aqueous solution, now substantially barren of the precious metal, and (C) the precious metal is subsequently recovered from the guanidine extraction reagent.

The improvement in the process lies in the specific guanidine extraction reagents employed which may be generally defined as having the formula:

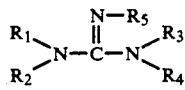

where $R_1$ through $R_5$ is selected from the group consisting of H, an ion exchange resin carrier (matrix, base or backbone) and hydrocarbon groups having up to 25 carbon atoms, and provided further that (1) when one of the R groups $R_1$ through $R_5$ is an ion exchange resin carrier, at least one of the remaining R groups is an aliphatic hydrocarbon group having 1 to 25 carbon atoms, and when other than methyl at least three of the R groups are hydrocarbon groups; and (2) when none of the R groups $R_1$ through $R_5$ is an ion exchange resin carrier, no more than one of the R groups are H and the remaining R groups are aliphatic hydrocarbon groups having from 1 to 25 carbon atoms, and the total number of carbon atoms in the R groups $R_1$ through $R_5$ is at least 16.

Accordingly, the present invention is applicable to a process for the recovery of precious metals such as gold or silver from an aqueous solution containing such metal values comprising (1) contacting the aqueous solution with a compound containing a functional guanidine group to extract at least a portion of the precious metal values from the aqueous solution, (2) separating the resultant metal-barren solution from the guanidine compound, and (3) recovering the precious metals from the guanidine compound.

The guanidine functional reagents provide for improvement in both a liquid/solid and a liquid/liquid leach solutions commonly employed in processes for recovering gold. The improved process provides not only for high levels of extraction of the precious metal, such as gold, but also provides for substantially higher selectivity for gold over silver, copper and/or zinc. These are complex cyanide anions that are typically present in alkaline, cyanide, gold leach solutions.

In a liquid/liquid extraction method, the reagent must be soluble in an organic solvent which is immiscible in relation to the aqueous cyanide leach solution. Thus, the guanidine reagent is dissolved in the organic solvent, which is then brought in contact with the aqueous cyanide solution containing the desired metal values. The guanidine reagent extracts the gold and/or silver metals from the cyanide leach solution which are now found in the organic phase which is immiscible with the aqueous phase. After separation of the organic phase from the aqueous phase, the organic phase containing the desired metal values are then stripped by contact with an aqueous caustic solution which strips the metal values from the organic phase. The metal values now in a more concentrated aqueous solution are then recovered in conventional methods, such as electrowinning.

In the liquid/solid extraction method, a guanidine reagent is first incorporated into a solid ion exchange carrier. Recovery of the gold from the cyanide solution is accomplished by contacting the cyanide solution with the ion exchange reagent carrier containing the guanidine functionality, at which point the metals are extracted from the aqueous cyanide solution onto the ion exchange carrier containing the guanidine reagent. The metal barren aqueous solution is then separated from the carrier containing the guanidine. The metal values are then stripped or eluted from the ion exchange carrier containing the guanidine functionality and recovered in the same manner as in the liquid/liquid extraction method.

The present invention is further directed to certain novel guanidine compounds and novel ion exchange resins carrying a guanidine functionality. By guanidine functionality is meant those compounds, reagents or ion exchange resins containing the functional group:

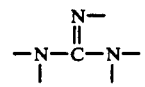

In regard to the ion exchange resins the group is bonded by chemical reaction to the resin through any one of the N atoms. The bonds of the nitrogen atoms otherwise are filled by hydrogen, aliphatic or aromatic hydrocarbon groups or cyclic (including heterocyclic groups containing nitrogen atoms), straight or branched chain, saturated and unsaturated. The R groups $R_1$ through $R_5$ filling the bonds of the N atoms in both the resin based and the non-resin based guanidine reagents are preferably aliphatic hydrocarbon groups, which includes cycloaliphatic and aralipatic (aromatic substituted aliphatic groups) having up to 25 carbon atoms. Aromatic groups, such as phenyl, tend to decrease the basicity to a level below a pKa of 12 and accordingly not more than one of the R groups should be phenyl. Further, any two of the nitrogen atoms may form a cyclic structure with an R group, thus providing compounds of the formula:

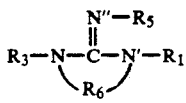

where $R_6$ is an aliphatic group having from 2–25 carbon atoms.

The preferred aliphatic hydrocarbon groups are the alkyl groups having from 1 to 25 carbon atoms, including the methyl, ethyl, propyl, butyl and higher alkyl groups such as cyclohexyl, 2-ethylhexyl, tridecyl (including isotridecyl), 2-hexyldecyl, 2-octyldodecyl, and oleyl which are particularly desirable. In the resin based products, the mono, di, tri and tetra-methyl substituted products also find utility in the process with the tri and tetra-alkyl substituted products in particular providing improved selectivity for gold. In the non-resin based guanidine reagents, the tetra and penta substituted product in particular provide for improved gold selectivity, particularly those having the higher alkyl groups noted above. Aspects and advantages of the present invention will be apparent to those skilled in the art upon consideration of the following detailed description thereof.

The liquid/liquid process of the invention is a liquid ion exchange process in which a water-insoluble guanidine compound is dissolved in an essentially water-immiscible liquid hydrocarbon solvent and the resulting solution is contacted with a metal-containing aqueous phase to extract a portion of the metal values into the organic phase. The phases are then separated and metal values are stripped from the organic phase by the use of an aqueous stripping medium.

A wide variety of essentially water-immiscible liquid hydrocarbon solvents can be used in the metal recovery process of the present invention. These include: aliphatic and aromatic hydrocarbons such as kerosenes, benzene, toluene, xylene and the like. A choice of the essentially water-immiscible liquid hydrocarbon solvents, or mixtures thereof for particular commercial operations will depend on a number of factors, including the design of the solvent extraction plant (i.e. mixer-settler units, Podbielniak extractors, etc.), the value of the metal being recovered, and the like. The process of the present invention finds particular use in the extraction recovery of the precious metals such as gold and/or silver. The preferred solvents for use in these precious metal recovery processes of the present invention are the aliphatic and aromatic hydrocarbons having flash points of 150° F. and higher and solubilities in water of less than 0.1% by weight. The solvents are also essentially chemically inert. Representative commercially available solvents are Chevron ion exchange solvent (available from Standard Oil of Calif.—flash point 195° F.), Escaid 100 and 110 (available from Exxon-Europe—flash point 180° F.), Norpar 12 (available from Exxon-USA—flash point 160° F.), Conoco-C1214 (available from Conoco—flash point 160° F.), Aromatic 150 (an aromatic kerosene available from Exxon-USA—flash point 150° F.), and the various other kerosenes and petroleum fractions available from other oil companies. In the process of the present invention, the organic solvent solutions will preferably contain from about 0.005 to 20% by weight of the guanidine compound and even more preferably from about 0.01–1% by weight thereof. Additionally, volume ratios of the organic:aqueous phase vary widely since the contacting of any quantity of the guanidine solution with the metal containing aqueous phase will result in extraction of metal values into the organic phase. However, for commercial practicality, the organic:aqueous phase ratios are preferably in the range of about 50:1 to 1:50. It is desirable to maintain an effective 0 to A ratio of about 1:1 in the mixer by recycle of one of the streams. For practical purposes the extracting and stripping are normally conducted at ambient temperatures and pressures, although higher and/or lower temperatures and/or pressures are entirely operable. Most advantageously, the entire process can be carried out continuously with the stripped organic solvent solution being recycled for contacting further quantities of the precious metal-containing cyanide solutions.

As indicated, in a liquid/liquid extraction process the guanidine reagent must be soluble in the organic water-immiscible solvent to the extent of about 0.005% by weight, or capable of being soluble to such extent through the use of a solubility modifier substance. Such solubility modifiers suitable for use in the present invention include long-chain ($C_6$–$C_{20}$) aliphatic alcohols such as n-hexanol, n-2-ethylhexanol, isodecanol, dodecanol, tridecanol, hexadecanol and octadecanol: long-chain alkyl phenols such as heptylphenol, octylphenol, nonylphenol and docecylphenol; and organic-phosphorus compounds such as trilower alkyl ($C_4$-$C_8$) phosphates, especially tributyl phosphate and tri(2-ethylhexyl) phosphate.

The extraction of the precious metals from their aqueous solution depends on a number of factors including, for example, the concentration of the metal ion, the particular anions present, and the pH of the aqueous solutions and the concentrations of and the particular guanidine used in the organic phase. Thus, for each aqueous metal solution and reagent solution of guanidine, there will be a preferred or optimum set of extraction conditions and those skilled int he art based on the information given herein, especially in respect of the examples to follow, will be able with a limited number of trial runs to determine such preferred or optimum conditions for the specific system under consideration. This is equally true of the stripping operations. By stripping is meant that at least a portion of the metal values in the loaded organic phase are transferred to the aqueous stripping medium. The metal values are then desirably recovered from the aqueous stripping medium by conventional techniques, preferably electrolysis. The loaded organic:aqueous stripping phase ratios can also vary widely. However, the overall object of the process is to provide a metal containing stripping solution of known composition and concentration suitable for the conventional recovery techniques such as by electrolysis. Thus, normally the metal will preferably be present in higher concentrations in the aqueous stripping medium than in the starting metal-containing solution. In this regard the starting aqueous metal-containing solutions will contain 1 to 5 ppm of gold, 1 to 2 ppm of silver and 5 to 10 ppm of copper plus tracts of other metals. A heap leach liquor will average 0.5 to 2 ppm gold, 0.5 to 2 ppm silver and 5 to 100 ppm copper plus other metals. The concentrations of gold in the aqueous strip solutions from which the gold will be recovered will be anywhere from about 50 to 1000 ppm. This will largely depend on the stripping solutions employed and the efficiency thereof. In the stripping step, the loaded organic:aqueous stripping medium phase ratio will preferably be in the range of about 1:1 to 20:1. The aqueous stripping solutions for use in the present invention will generally be basic stripping solutions having pH in excess of 11.0. The stripping reagent preferably employed is caustic sodium hydroxide solution, which solution may also contain cyanide anions, having a pH above 11, generally 12 or above and preferably at least 13. Potassium or calcium hydroxide solutions may also be employed. After removal of the metal from the aqueous stripping solution by conventional techniques, the caustic aqueous solution is recycled.

The preferred guanidine compounds suitable for the liquid/liquid system may be defined by the formula

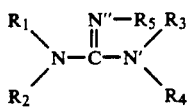

where R groups $R_1$ through $R_5$ individually are selected from the group consisting of H and hydrocarbon groups having up to 25 carbon atoms (1–25), no more than one of the R groups being H and the total number of carbon atoms in the R groups being at least 16 and at least one of said hydrocarbon groups having at least 6 carbon atoms.

For use in the liquid/liquid extraction process the water-insoluble guanidine compounds are soluble in water immiscible hydrocarbon solvents, and the precious metal salts are soluble therein, to the extent of at least 0.005% by weight. For use in the extraction process, the compounds also have a pKa in water of greater than 12 and preferably than 13. A discussion of basic strengths of methylated guanidine and pKa values thereof can be seen in "The basic Strength of Methylated Guanidines", S. J. Angyal and W. K. Worberton, pages 2492-2494 of J. Chem. Soc., 1951. In the liquid/solid extraction process, an ion exchange resin incorporates the guanidine functionality by chemical reaction with the guanidine compounds.

The foregoing description has dealt with the liquid/liquid extraction systems. As earlier indicated, liquid/solid systems can be employed, in which a guanidine reagent is incorporated into an ion exchange resin by chemically bonding the guanidine functionality to the resin backbone. In this regard, the terms "extracting" used herein is to be understood as including both liquid and solid means for selectively removing and otherwise separating the precious metal values. As the ion exchange resin containing the guanidine functionality will be used to treat or contact a gold-containing aqueous solution, the ion exchange resin must be one which is water-insoluble. Upon contact of the aqueous cyanide solution containing the precious metals, the precious metals are selectively absorbed by the guanidine reagent on the ion exchange resin. The metal values are then eluted from the ion exchange resin by contact with the sodium hydroxide solution such as the stripping solution mentioned earlier above. The techniques employed in the production of water-insoluble ion exchange resins employed in the process of the present invention are well-known to those skilled in the art, and especially, to those skilled in the art of polymerizing monomers to produce polymeric compositions useful as ion exchange resins. In the present invention, the preferred ion exchange resin is a chloromethylated polystyrene divinylbenzene resin, which upon chemical reaction with the appropriate compound, provides a guanidine functionality carried by the ion exchange resin. Such resins containing varying divinylbenzene (DVB) contents are well known to those skilled in the art. Resins containing up to 25% DVB content may be employed. However, the preferred polystyrene resins will generally not exceed 13–15% DVB content. It is also desirable that the DVB content be at least 3–4% with about 8–10 being most preferred.

While the polystyrene resins are preferred, ion exchange resins having a different base, matrix or backbone may be used. Any suitable matrix or backbone which can carry the guanidine functionality as an active group may be employed. It is preferred that the resin carry essentially only guanidyl functionality, as other groups may interfere with the improved performance by the reagents of the present invention. Other resin bases of matrices which are suitable are the urea formaldehyde or melamine formaldehyde resins.

The particle size of the ion exchange resin can vary widely, so long as the size range is generally fine enough to exhibit desirable loading and elution kinetics and yet large enough to (a) allow the solution to flow through the bed without binding or building up excess pressure; and (b) allow convenient screening of the resin from the aqueous solution. Preferably, about a 6–12 mesh size is employed. The loading of the water-insoluble ion exchange resins with the guanidine can vary widely. Generally, it will be determined by the bed-volume characteristics of the particular water-insoluble ion exchange resin. Typically, the flow rates through the ion exchange bed will be such as to assure effective absorption onto the water-insoluble ion exchange resins.

After the water-insoluble ion exchange resin containing the guanidine reagent has been loaded with the precious metal values, the aqueous cyanide solution is separated from the ion exchange resin and the absorbed precious metal values are eluted from the ion exchange resin. The suitable eluants as indicated are the same as the aqueous stripping solutions employed in the liquid/liquid extraction process. The most efficient and effective eluent is an aqueous solution of sodium hydroxide having a pH above 11, more desirably above 12, and preferably at least 13.

To further illustrate the various objects and advantages of the present invention, the following examples are provided. It is understood that their purpose is entirely illustrative and in no way intended to limit the scope of the invention.

EXAMPLE I

Preparation of Di-, Tri- and Tetra-Alkylguanidine

A. N, N-Bis(2-ethylhexyl) - N', N"-dicyclohexylguanidine 41.3 Gm. (0.2 mole) of dicyclohexylcarbodiimide, 72.4 gm. (0.3 mole) of bis-2-ethylhexylamine, and 200 ml. of t-butanol were refluxed for 7 hours. The t-butanol was distilled off at atmospheric pressure and the residue stripped to a temperature of 180° C. at 0.08–0.09 mm Hg. The residue weighed 60.8 gm. and was 90% pure by NMR with a trace of amine and approximately 5% dicyclohexylcarbodiimide.

B. Analogous preparations of other dicyclohexylguanidines were conducted by replacing the bis-2-ethylhexylamine with other primary or secondary amines. Thus, using di-n-butylamine gave the corresponding di-n-butyldicyclohexyl guanidine; using 2-ethylhexylamine gave 2-ethylhexyl-dicyclohexyl guanidine; n-octylamine gave octyl-dicyclohexylguanidine and isotridecylamino gave isotridecyl-dicyclohexyl guanidine.

C. N.N'-Bisisotridecylguanidine 60.6 Gm. (0.657 Mole) of cyanogen bromide and 750 ml. of heptane were added to a 2 l. flask and 524.6 gm. (2.63 mole) of tridecylamine (mixed isomers) was added over 32 min. while the temperature was controlled at 25°-30° C. by cooling. The reaction was then heated to reflux overnight. The cooled reaction mixture was diluted with ethyl ether and washed 3 times with 5% NaOH. The product phase was then dried and stripped of solvent to give 568.7 gm. of residue. This residue was then stripped in the Kugelrohr to a temperature of 120° C. at 0.05 mm Hg. to give 270.4 gm. of product which was 81-89% product guanidine and 11% starting amine.

EXAMPLE II

Preparation of Methyl-substituted Guanidine Resins

A. N-Methyl- and N,N-Dimethylguanidine Resin (1) Preparation of resin with —CH2NH2 functionality:

To a refluxing solution of macroporous polystryenedivinylbenzene beads (60 g) in 1, 2-dichloroethane (180 ml) and anhydrous tin tetrachloride (3 ml) was slowly added N-chloromethylphthalimide (40 g) over 0.5 hour. The mixture was kept at this temperature for 4 hours. After cooling to room temperature, the beads were filtered and washed with 1, 2-dichloroethane, followed by methanol. IR showed that the beads were incorporated with imide functionality.

Then the beads (58 g) were hydrolyzed with hydrazine (21 ml) and sodium hydroxide (4 g) in ethanol (180 ml). The mixture was heated to reflux, and the reaction was monitored by IR till imide absorption disappeared. IR showed that the beads had NH2 functionality.

(2) Preparation of resin with -CH2-NH-(C=NH)-NHMe functionality

The above beads (8 g) were contacted with a solution of hydrochloric acid to convert the —NH2 groups to —NH2.HCL. The filtered beads were treated with methylcyanamide (100 mmol, prepared from cyanogen bromide and methylamine at 0° C. in ether) in refluxing butanol (100 ml) for 12 hrs. Then the beads were filtered and washed successively with NaOH solution, water, methanol and ether, and dried under vacuum. An IR spectrum of the resin showed that it contained guanidine functionality.

This reaction was repeated, replacing the methylcyanamide with N,N-dimethylcyanamide, to prepare a N,N-dimethyl-guanidine resin.

B. N,N,N',N'-Tetramethylguanidine Resin (1) Chloromethylation of macroporous polystyrenedivinyl-benzene beads Surfurylchloride (54 g) was slowly added to dimethoxymethane between 15° C. to 20° C. To this mixture were added polystyrenedivinylbenzene beads (40 g). After 3 hrs of stirring, tin tetrachloride (4 g) was added and the solution was heated to reflux (about 45° C.) for 7 hrs. The beads were isolated and washed with tetrahydrofuran. Elemental analysis showed that the resin contained 8% chloride.

(2) Incorporation of N,N,N',N'-tetramethyl guanidine into the chloromethylated beads The chloromethylated beads (20 g) were mixed with 100 mmol of N,N,N',N'-tetramethylguanidine in toluene (200 ml) and tetrahydrofuran (200 ml). The mixture was heated to reflux for 2 days. The beads were filtered, washed with aqueous caustic, water, ethanol and ether, and dried under air.

The products of Example I were then evaluated in gold extraction providing McCabe-Thiele extraction isotherms and to illustrate the improved selectivity performance of the more highly substituted hydrocarbon guanidines (tetra and penta). The experimental procedures employed in this evaluation were as follows:

EXAMPLE III

EXPERIMENTAL PROCEDURES

1. Preparation of extraction solutions and aqueous feed solutions

The solvent used in these solvent extraction processes was either Aromatic 150, an aromatic kerosene, or Escaid 110, an aliphatic kerosene, as noted. The extractant, a bis-, tris-, or tetra-alkylguanidine, as noted, was used in the solvent in a concentration of 10 mM. The organic solution also included 50 g/L tridecanol as a co-solvent.

Each mixed-metal aqueous feed solutions contained 1 g/L NaCN, pH 10.8, ca. 50 mg/L Fe and the concentrations of Au, Ag, Cu and Zn noted in the tables.

2. Procedure for McCable-Thiele extraction isotherm experiments (Tables 1-3)

The organic extraction solution and the aqueous feed solution, in v/v ratios of organic/aqueous=2/1, 1/1 and 1/2, were placed in a separatory funnel and contacted for 10 min.

For each test, the phases were then allowed to separate. Each phase was filtered and collected. The aqueous phases were analyzed for metal concentration by atomic absorption spectroscopy (AAS), as was the original feed solution. Values for metal concentrations in the loaded organic solutions were calculated from the AAS data for the aqueous samples. In some experiments, the metal-loaded organic phase was analyzed by AAS and this data was used as a check on the aqueous AAS data.

3. Procedure for extraction and selectivity performance experiment (Table 4)

The organic extraction solution (30 mL) and the aqueous feed solution (30 mL) were placed in a separatory funnel and contacted 10 min. The phases were then allowed to separate. Each phase was filtered and collected. The aqueous phase was analyzed for metal concentration by atomic absorption spectroscopy (AAS), as was the original feed solution. Values for metal concentrations in the loaded organic solutions were calculated from the AAS data for the aqueous samples.

TABLE 1

| McCABE-THIELE EXTRACTION ISOTHERM Bis(isotridecyl)guanidine |
|---|
| extraction solution: 10 mM guanidine, 50 g/L tridecanol in Escaid 110 kerosene |
| feed solution: 14.7 mg/L Au, 52.1 mg/L Ag, 53.9 mg/L Cu, 56.7 mg/L Zn |
| metal concentration in loaded organic (mg/L) |

TABLE 1-continued

McCABE-THIELE EXTRACTION ISOTHERM
Bis(isotridecyl)guanidine

| O/A | Au | Ag | Cu | Zn |
|---|---|---|---|---|
| 2/1 | 6.30 | 21.4 | 16.5 | 27.8 |
| 1/1 | 2.3 | 35.4 | 20.9 | 54.1 |
| 1/2 | 23.2 | 51.2 | 20.6 | 101 |

TABLE 1A

Extraction selectivity performance of
Bis(isotridecyl)guanidine
(O/A = 1/1)

extraction solution: 10 mM guanidine, 50 g/L tridecanol in Escaid 110 kerosene

| | ratio of Au in solution/metal in solution | | | |
|---|---|---|---|---|
| solution | % Au extracted | Ag | Cu | Zn |
| feed solution | — | 0.282 | 0.273 | 0.259 |
| loaded organic | 83.7 | 0.347 | 0.588 | 0.227 |

TABLE 2

McCABE-THIELE EXTRACTION ISOTHERM
Bis(cyclohexyl)-(isotridecyl)guanidine extraction solution: 10 mM guanidine, 50 g/L tridecanol in Escaid 110 kerosene
feed solution: 14.8 mg/L Au, 52.7 mg/L Ag, 52.7 mg/L Cu, 55.7 mg/L Zn

| | metal concentration in loaded organic (mg/L) | | | |
|---|---|---|---|---|
| O/A | Au | Ag | Cu | Zn |
| 2/1 | 7.80 | 17.5 | 13.8 | 27.4 |
| 1/1 | 13.8 | 29.7 | 14.7 | 54.40 |
| 1/2 | 26.2 | 43.6 | 18.2 | 106 |

TABLE 2A

Extraction and selectivity performance of
Bis(cyclohexyl)-(isotridecyl)guanidine
(O/A = 1/1)

extraction solution: 10 mM guanidine, 50 g/L tridecanol in Escaid 110 kerosene

| solution | % Au extracted | Ag | Cu | Zn |
|---|---|---|---|---|
| feed solution: | — | 0.281 | 0.281 | 0.266 |
| loaded organic: | 93.2 | 0.465 | 0.939 | 0.254 |

TABLE 3

McCABE-THIELE EXTRACTION ISOTHERM
Bis(cyclohexyl)-bis(2-ethylhexyl)guanidine extraction solution: 10 mM guanidine, 50 g/L tridecanol in Aromatic 150 kerosene
feed solution: 16.9 mg/L Au, 28.8 mg/L Ag, 28.7 mg/L Cu, 28.9 mg/L Zn metal concentration in loaded organic (mg/L)

TABLE 3-continued

McCABE-THIELE EXTRACTION ISOTHERM
Bis(cyclohexyl)-bis(2-ethylhexyl)guanidine

| O/A | Au | Ag | Cu | Zn |
|---|---|---|---|---|
| 2/1 | 7.80 | 7.00 | 0.01 | 12.8 |
| 1/1 | 14.9 | 11.2 | 0.02 | 9.30 |
| 1/2 | 27.2 | 16.2 | 0.04 | 10.0 |

TABLE 3A

McCABE-THIELE EXTRACTION ISOTHERM
Bis(cyclohexyl)-bis(2-ethylhexyl)guanidine extraction solution: 10 mM guanidine, 50 g/L tridecanol in Aromatic 150 kerosene

| solution | % Au extracted | Ag | Cu | Zn |
|---|---|---|---|---|
| feed solution | — | 0.587 | 0.589 | 0.585 |
| loaded organic | 88.2 | 1.33 | 745 | 1.61 |

TABLE 4

Extraction and selectivity performance of various tris- and tetra-alkyl guanidines extraction solutions: 10 mM guanidine, 50 g/L tridecanol in Escaid 110 kerosene
feed solution: 15.1 mg/L Au, 51.5 mg/L Ag, 53.1 mg/L Cu, 52.7 mg/L Zn

| | 11/30 ratio of Au extracted/metal extracted | | | |
|---|---|---|---|---|
| | % Au extracted | Ag | Cu | Zn |
| Bis(cyclohexyl)-bis(n-butyl)guanidine | 82.8 | 1.15 | 125 | 0.424 |
| Bis(cyclohexyl)-(n-octyl)guanidine | 97.4 | 0.383 | 0.662 | 0.282 |
| Bis(cyclohexyl)-(2-ethylhexyl)guanidine | 95.4 | 0.453 | 0.873 | 0.277 |
| ratio of Au to other metals in feed solution: | | 0.293 | 0.284 | 0.287 |

The product of Example II, the methyl-substituted guanidine resins, were also evaluated for the extraction and stripping of gold. In such resin guanidine reagents, one of the N atoms of the guanidine is already substituted with the resin so that the tri-methyl and tetra-methyl substituted resins are highly substituted.

EXAMPLE IV

Extraction and stripping of gold

A. N-methylguanidine Resin

Loading: Varying weights of N-methylguanidine resin were contacted with 10 ml portions of aqueous solution containing 14.5 ppm gold and 500 ppm cyanide at a pH of about 10. The gold concentrations remaining in the aqueous raffinates were as follows:

| Weight of resin | [Au] in raffinate |
|---|---|
| 10 mg | 1.19 ppm |
| 24 mg | <0.1 ppm |
| 66 mg | <0.1 ppm |
| 79 mg | <0.1 ppm |

Stripping: 150 mg of resin was loaded by contacting with 50 ml of aqueous solution containing 120 ppm gold and 500 ppm cyanide at pH 9.8, giving 166 mg of loaded resin and a raffinate containing 1.27 ppm of gold. The loaded resin was then stripped with 10 ml of aqueous solution containing 1.0% NaOH and 0.5% NaCN at different resin/aqueous ratios. The gold concentrations produced in the aqueous were as follows:

| Weight of loaded resin | [Au] in aqueous |
|---|---|
| 6.2 mg | 6.7 ppm |

-continued

| Weight of loaded resin | [Au] in aqueous |
|---|---|
| 12 mg | 13.7 ppm |
| 19 mg | 25.5 ppm |
| 25 mg | 27.6 ppm |

B. N, N-dimethylguanidine Resin

Loading: Varying weights of resin were contacted with 10 ml portions of aqueous solution containing 14.5 ppm gold and 500 ppm cyanide at a pH of about 10. The gold concentrations remaining in the aqueous raffinates were as follows:

| Weight of Resin | [Au] in raffinate |
|---|---|
| 14 mg | <0.12 ppm |
| 30 mg | <0.1 ppm |
| 70 mg | <0.1 ppm |
| 96 mg | <0.1 ppm |

Stripping: 150 mg of resin was loaded by contacting with 50 ml of aqueous solution containing 120 ppm gold and 500 ppm cyanide at pH 9.8, giving 200 mg of loaded resin and a raffinate containing 1.19 ppm of gold. The loaded resin was stripped with 10 ml of aqueous solution containing 1.0% NaOH and 0.5% NaCN at different resin/aqueous ratios. The gold concentrations produced in the aqueous were as follows:

| Weight of loaded resin | [Au] in aqueous |
|---|---|
| 7.5 mg | 7.25 ppm |
| 15 mg | 13.2 ppm |
| 29 mg | 24.2 ppm |
| 63 mg | 38.8 ppm |

C. Tetramethylguanidine resin

Loading: Varying weights of resin were contacted with 10 ml portions of aqueous solution containing 135.5 ppm gold and 500 ppm cyanide at pH-10. The gold concentration remaining in the aqueous raffinate was as follows:

| Weight of resin | [Au] in raffinate |
|---|---|
| 32 mg | 113 ppm |
| 75 mg | 77 ppm |
| 174 mg | 36 ppm |
| 267 mg | 26.5 ppm |

Stripping: One g of resin was loaded by contacting with 50 ml of aqueous solution containing 1000 ppm gold and 500 ppm cyanide at pH=11.9, giving 1.40 g of loaded resin and a raffinate containing 828 ppm of gold. The loaded resin was stripped with 10 ml of aqueous solution containing 1.0% NaOH and 0.5% NACN at different resin/aqueous ratios. The gold concentration produced in the aqueous was as follows:

| Weight of loaded resin | [Au] in aqueous |
|---|---|
| 49 mg | 24.8 ppm |
| 78 mg | 36.6 ppm |
| 160 mg | 66.6 ppm |

The foregoing experiments illustrate that the more highly substituted guanidine products, tetra- or penta-hydrocarbon substituted non-resin guanidine reagent compounds, provide for improved selectivity for gold over other metals present in the aqueous, alkaline, cyanide solution. In the resin base or backbone products, one of the N atoms is substituted with the resin matrix or backbone, so that a tri- or tetra-hydrocarbon substituted resin reagent will correspond to the tetra- or penta-hydrocarbon substituted non-resin products, providing improved selectivity. The data in Example IV also illustrates that the methyl substituted resin guanidine reagents also provide for extraction of gold from the aqueous, alkaline, cyanide solution and it is not necessary that the resin reagent employed in a solid/liquid system contain hydrocarbon groups having at least 2 carbon atoms in any hydrocarbon substituted product, although higher hydrocarbon substituted groups may be necessary in liquid/liquid systems to provide the necessary solubility characteristics for such liquid/liquid system.

We claim:

1. An improved process for the recovery of a precious metal from aqueous, alkaline, cyanide solution containing said metal, wherein said aqueous, alkaline, cyanide solution containing said precious metal is contacted with a guanidine functional extraction reagent whereby said precious metal is extracted from said aqueous solution and said guanidine functional extraction reagent now containing said precious metal is separated from said aqueous solution and said precious metal is subsequently recovered from said guanidine extraction reagent, the improvement comprising said guanidine functional extraction reagent having the formula

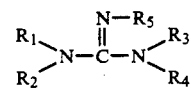

wherein $R_1$ through $R_5$ is selected from the group consisting of H, an ion exchange resin carrier and hydrocarbon groups having up to 25 carbon atoms and provided further that (1) when one of the R groups $R_1$ through $R_5$ is an ion exchange resin carrier at least one of the remaining R groups is an aliphatic hydrocarbon group having 1 to 25 carbon atoms, and when other than methyl at least three of said R groups are hydrocarbon groups and (2) when none of the R groups $R_1$ through $R_5$ is an ion exchange resin carrier, no more than one of the R groups are H and the remaining R groups are hydrocarbon groups having from 1 to 25 carbon atoms, and the total number of carbon atoms in the R groups $R_1$ through $R_5$ is at least 16.

2. A process as defined in claim 1 wherein when one of the R groups $R_1$ through $R_5$ is an ion exchange resin at least one of the R groups is a methyl group.

3. A process as defined in claim 2 wherein at least two of the R groups are methyl groups.

4. A process as defined in claim 3, wherein at least three of the R groups are methyl groups.

5. A process as defined in claim 3, wherein all the remaining R groups are methyl.

6. A process as defined in claim 1 wherein one of the R groups $R_1$ through $R_5$ is an ion exchange resin all the remaining groups are alkyl groups having up to 25 carbon atoms.

7. A process as defined in claim 6 wherein said alkyl groups are straight or branched chain and are the same or different.

8. A process as defined in claim 1 wherein one of the R groups $R_1$ through $R_5$ is a polystyrene divinylbenzene resin and the remaining groups are methyl.

9. A process as defined in claim 1 wherein the R groups $R_2$ through $R_5$ may be the same or different, saturated or unsaturated, and
   (a) any two hydrocarbon groups may form a cyclic structure with one or more N atoms; and
   (b) no more than one R group is aromatic.

10. A process as defined in claim 1, wherein none of the R groups $R_1$ through $R_5$ is an ion exchange resin, one of the R groups is H and the remaining R groups are aliphatic hydrocarbon groups having 1 to 25 carbon atoms at least one of said hydrocarbon groups containing at least 6 carbon atoms.

11. A process as defined in claim 1 wherein none of the R groups $R_1$ through $R_5$ is an ion exchange resin and all the R groups are aliphatic hydrocarbon groups having 1 to 25 carbon atoms at least one of said hydrocarbon groups containing at least 6 carbon atoms.

12. A process as defined in claim 11 wherein said hydrocarbon groups are straight or branched chain and are the same or different.

13. A process as defined in claim 1 wherein said precious metal is gold or silver.

14. A process for the recovery of a precious metal from aqueous alkaline cyanide solutions containing said metal comprising
   (A) Contacting said aqueous solution containing said precious metal with an organic phase comprising a water-immiscible solvent and a guanidine compound having a pKa at 25° C. greater than 12, wherein said precious metal value is extracted from said aqueous solution, said guanidine compound having the formula

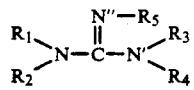

wherein R groups $R_1$ through $R_5$ individually are selected from the group consisting of H and hydrocarbon groups having up to 25 carbon atoms, no more than one of the R groups being H and the total number of carbon atoms in the R groups being at least 16 and at least one of said hydrocarbon groups having at least 6 carbon atoms;
   (B) separating said precious metal-barren aqueous solution from said organic phases containing said guanidine compound; and
   (C) recovering said precious metal values from said organic phase.

15. A process as defined in claim 14 wherein said precious metal is gold or silver.

16. A process as defined in claim 14 wherein the step of recovering said metal values from said organic phases comprises stripping said precious metal values from said organic base by means of an aqueous alkaline solution having a pH above 12.

17. A process as defined in claim 16 wherein said aqueous alkaline solution is a NaOH, KOH or Ca(OH)$_2$ solution.

18. A process as defined in claim 14 wherein said hydrocarbon groups are selected from the group consisting of cyclohexyl, butyl, 2-ethylhexyl, 2-hexyldecyl, 2-octyldodecyl, oleyl and isotridecyl.

19. A process as defined in claim 14 wherein said guanidine compound is selected from the group of bis(2-ethylhexyl)-dicyclohexylguanidine and bis(n-butyl)-dicyclohexylguanidine.

20. A process for the recovery of a precious metal from aqueous alkaline cyanide solutions containing said metal comprising:
   (A) contacting said aqueous solution containing said precious metal with an ion exchange resin carrying guanidine functionality having a pKa at 25° C. greater than 12, wherein said precious metal value is extracted from said aqueous solution, said ion exchange resin carrying said guanidyl functionality having the formula:

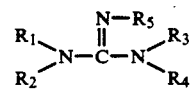

where one of the R groups $R_1$ through $R_5$ is an ion exchange resin, the remaining R groups being selected from the group consisting of H and hydrocarbon groups having 1 to 25 carbon atoms and at least one of said R groups being an aliphatic hydrocarbon group and when other than methyl at least three of said R groups are hydrocarbon;
   (B) separating said aqueous solution from said ion exchange resin carrying said guanidyl functionality; and
   (C) recovering said precious metal from said ion exchange resin.

21. A process as defined in claim 20 wherein said precious metal is gold or silver.

22. A process as defined in claim 20 wherein the step of recovering said precious metal from said ion exchange resin comprises eluting said precious metal from said ion exchange resin by means of an aqueous solution having a pH above 12.

23. A process as defined in claim 22 wherein said aqueous alkaline solution is a NaOH, KOH or Ca(OH)$_2$ solution which may also contain cyanide anions.

24. A process as defined in claim 20 wherein said ion exchange resin carrying guanidyl functionality is a polystyrene divinylbenzene resin.

25. A process as defined in claim 24 wherein the polystyrene ion exchange resin carrying guanidyl functionality is selected from the mono, di, tri and tetramethyl substituted guanidine polystyrene divinylbenzene resin.

26. Bis(cyclohexyl)-bis(alkyl) guanidine where the alkyl group is selected from the group, consisting of 2-ethylhexyl, 2-hexyldecyl, 2-octyldodecyl, tridecyl and oleyl.

27. Bis(cyclohexyl)-bis(2(ethylhexyl) guanidine.

28. An ion exchange resin having guanidyl functionality having the formula:

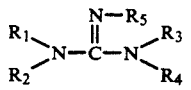

where one of the R groups $R_1$ through $R_5$ is an ion exchange resin and at least one of the remaining R groups is an aliphatic hydrocarbon group having from 1 to 25 carbon atoms and when other than methyl at least three of said R groups are hydrocarbon, and no more than three of said R groups are methyl.

29. An ion exchange resin having guanidyl functionality as defined in claim 28 wherein said ion exchange resin is a polystyrene divinylbenzene resin.

30. An ion exchange resin as defined in claim 28 wherein said resin is selected from the group consisting of the mono, di and tri-methyl substituted guanidine resin.

* * * * *

UNITED STATES PATENT AND TRADEMARK OFFICE
CERTIFICATE OF CORRECTION

PATENT NO. : 5,028,259

DATED : July 2, 1991

INVENTOR(S) : Lon-Tang W. Lin et al

It is certified that error appears in the above-identified patent and that said Letters Patent is hereby corrected as shown below:

On Title Page, at Item [22] the application date should read --Mar. 6, 1990--.

At Column 15, in Claim 16, line 62, "base" should read --phase--.

Signed and Sealed this

Twenty-second Day of December, 1992

Attest:

DOUGLAS B. COMER

*Attesting Officer*  *Acting Commissioner of Patents and Trademarks*